United States Patent
Sodergren

(10) Patent No.: US 7,603,471 B2
(45) Date of Patent: Oct. 13, 2009

(54) PROTOCOL ADAPTER FOR TRANSFERRING DIAGNOSTIC SIGNALS BETWEEN IN-VEHICLE NETWORKS AND A COMPUTER

(75) Inventor: Jason Sodergren, Detroit, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 978 days.

(21) Appl. No.: 10/970,199

(22) Filed: Oct. 21, 2004

(65) Prior Publication Data

US 2005/0083965 A1 Apr. 21, 2005

Related U.S. Application Data

(63) Continuation of application No. 09/785,123, filed on Feb. 16, 2001.

(60) Provisional application No. 60/186,533, filed on Mar. 2, 2000.

(51) Int. Cl.
*G06F 15/16* (2006.01)
(52) U.S. Cl. .................. 709/230; 709/217; 709/218
(58) Field of Classification Search .................. 709/221, 709/230, 217, 218
See application file for complete search history.

(56) References Cited

U.S. PATENT DOCUMENTS

| | | | |
|---|---|---|---|
| 5,530,842 A * | 6/1996 | Abraham et al. ............ 709/221 |
| 5,548,587 A | 8/1996 | Bailey et al. | |
| 5,590,313 A | 12/1996 | Reynolds et al. | |
| 5,771,232 A | 6/1998 | Sinibaldi et al. | |
| 5,832,240 A * | 11/1998 | Larsen et al. ............... 710/105 |
| 5,832,244 A | 11/1998 | Jolley et al. | |
| 5,905,885 A * | 5/1999 | Richter et al. .................. 710/5 |
| 5,968,158 A | 10/1999 | Andrews et al. | |
| 6,003,097 A * | 12/1999 | Richman et al. ............... 710/8 |
| 6,167,253 A | 12/2000 | Farris et al. | |
| 6,189,057 B1 | 2/2001 | Schwanz et al. | |
| 6,298,370 B1 | 10/2001 | Tang et al. | |
| 6,321,091 B1 | 11/2001 | Holland | |
| 6,396,164 B1 | 5/2002 | Barnea et al. | |
| 6,400,996 B1 | 6/2002 | Hoffberg et al. | |
| 6,405,049 B2 | 6/2002 | Herrod et al. | |
| 6,418,324 B1 | 7/2002 | Doviak et al. | |
| 6,526,335 B1 | 2/2003 | Treyz et al. | |
| 6,526,340 B1 * | 2/2003 | Reul et al. .................... 701/29 |
| 6,539,027 B1 * | 3/2003 | Cambron .................... 370/442 |
| 6,549,945 B1 | 4/2003 | Sinibaldi et al. | |
| 6,691,183 B1 | 2/2004 | Ryan, Jr. | |

* cited by examiner

*Primary Examiner*—William C Vaughn, Jr.
*Assistant Examiner*—Kristie D Shingles
(74) *Attorney, Agent, or Firm*—Warn Partners, P.C.

(57) ABSTRACT

A protocol adapter for simultaneously communicating with one or more remote computers over any one of a plurality of protocols. The adapter includes a motherboard having an integrated CPU, a plurality of interface modules, a plurality of device drivers and a plurality of daughter-board module slots. The protocol adapter further includes at least one daughter-board interface module mounted in one of the plurality of daughter-board slots. The at least one daughter-board modules expands the number of protocols of the adapter beyond those protocols being run by the motherboard.

20 Claims, 11 Drawing Sheets

PROTOCOL ADAPTER FOR TRANSFERRING DIAGNOSTIC SIGNALS BETWEEN IN-VEHICLE NETWORKS AND A COMPUTER

CROSS-REFERENCE TO RELATED APPLICATIONS

This is a Continuation Application of U.S. patent application Ser. No. 09/785,123, titled Multi-Protocol Adapter for In-Vehicle and Industrial Communications Networks, filed Feb. 16, 2001, which claims the benefit of the priority date of U.S. Provisional Patent Application Ser. No. 60/186,533, titled Multi-Protocol Adapter for In-Vehicle and Industrial Communications Networks, filed Mar. 2, 2000.

BACKGROUND OF THE INVENTION

The field of the invention pertains to in-vehicle and industrial communications networks for diagnostics, analysis and monitoring. Multiplex communication networks are used in automotive and industrial automation application. However, the ability was needed to access, monitor, control and modify/update any and all functions or capabilities of another device utilizing such communication networks.

SUMMARY OF THE INVENTION

The invention is a hardware/software system that provides a programmable gateway between many types of automotive/industrial serial multiplex networks and Ethernet-connected computers and networking equipment. The hardware/software system provides user applications with the ability to perform control, transmit and receive operations on such automotive and industrial multiplex networks.

User applications may reside either on a hardware device itself (in a stand-alone manner) or on remote computers with connectivity to one or more hardware units via the Ethernet and the TCP/IP protocol. Use of TCP/IP protocol and Ethernet ensure compatibility with a wide range of existing networks and computing equipment.

User applications include, but are not limited to, network monitors and analyzers, diagnostic programs, gateway/routers between one or more of the supported networks, multiplex network node and/or vehicle simulators, and general engineering tools.

The hardware/software system supports multiple simultaneous client applications. Duplicate streams of the multiplex network data are sent to all interested client applications.

A predefined set of services are available via a default hardware/software system configuration. These services include multiplex message scheduling functions, message filtering functions, simple message gatewaying and autoresponding functions, and client transmit/receive access to all data frames present on any of the supported multiplex network interfaces.

These and other advantages and features of novelty which characterize the invention are discussed below for a more complete understanding of the present invention, where reference is made to the following detailed description when read in conjunction with the accompanying drawings, where like reference characters refer to like elements throughout the several views.

DETAILED DESCRIPTION OF THE EMBODIMENTS

Figure 1:
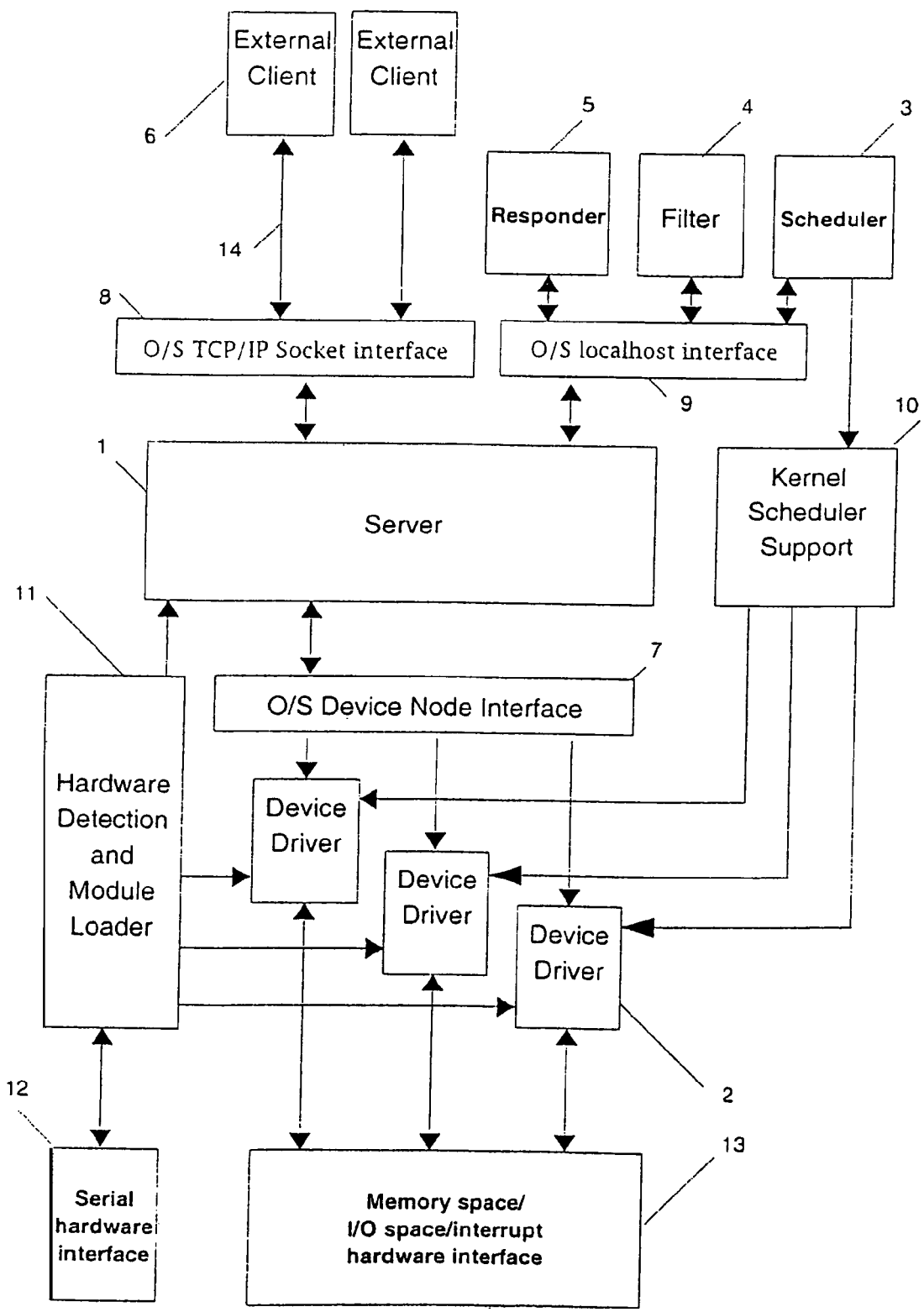
FIG. 1 illustrates device mainboard overview.

The following discussion of the embodiments of the invention directed to a protocol adapter for transferring diagnostic signals between in-vehicle networks in a computer is merely exemplary in nature, and is in no way intended to limit the invention or its applications or uses.

The invention is a device (or adapter or instrument) for providing the user with a remote access point for interaction between the device and one or more target devices running one or more of several communication protocols supported by the device. As described above, automotive and industrial automation application employ such protocols (also known as multiplexed communication networks).

The device of the invention advantageously provides the user with the ability to access, monitor, control and modify/update any and all functions or capabilities of another device utilizing the same communication protocol that the user has selected. The user is able to control these functions as a result of a unique communication dialogue established between the device and the target device.

The device has the capability of simultaneous interaction with multiple devices utilizing multiple protocols. Interactive control capability established with the target device includes, but is not limited to, interrogating, monitoring, retrieving data, downloading data, recording data, revising/updating data, performing diagnostics and revising/updating the operating program of the target device.

Daughtercard interface modules are based on the ISA Interconnect Standard even though they utilize small, space-saving connectors (as opposed to the standard ISA board-edge interconnections). As a result, they occupy a much smaller and more compact area than would otherwise be possible for a standard plug-in module utilizing the ISA format.

Daughtercard interface modules can be plug-in modules to provide support for the following protocols: SAE J1850 (GM, Ford and Chrysler versions), UBP (Ford), CCD (Chrysler), SCI (Chrysler), CAN, SAE J1587, J1939, J2284 (high speed CAN), J2411 (single wire CAN), ISO 11992, 9141-2 and KWP2000.

New communication protocols may be added to the device capabilities at any time by creating a new daughtercard module for supporting the new protocol.

Daughtercard interface modules provide the user with automatic detection capability for all of the designated communication protocols. This allows the user the flexibility of choosing a "mix or match" combination of the various protocols, i.e., three of the same or three different protocols. More daughter cards can be added as necessary to support more channels.

The device is also capable of functioning as a "stand-alone" network interface, without the need for a keyboard, monitor, or host PC. Multi-protocol networks, such as IDB networks or those multi-protocol networks accessed via a universal gateway, may have unique access and/or diagnostic requirements.

The device's ability to simultaneously access and interact with multiple devices/protocols, automatically provides to the device with the compatibility required for an access tool or diagnostic tool for multi-protocol networks. The device uses an Ethernet connection to provide the high-speed communications interface that is necessary for the interaction with the newer, high throughput protocols.

Another capability of the device is its ability to reliably monitor, sample evaluate and manipulate the real-time data usually associated with these high-speed protocols.

The device maximizes flexibility by ensuring compatibility with hardware interfaces and other network tools commonly used in conjunction with these supported network protocols.

Communication between the device server, clients, plug-in applications and protocol stacks occurs by a communication protocol (hereafter referred to as the device communication protocol, or CP). The CP provides a mechanism for the communication of serial multiplex network messages between software entities in such a way that knowledge of the specific format of the messages of a specific type of multiplex network is not required. The serial multiplex networks involved are automotive and/or industrial automation networks, including but not limited to CAN (ISO11898, GM Single-wire, and others), J1850 (GM, Ford and Chrysler variants), Keyword Protocol 2000, and various other UART-based protocols.

This generalized representation of the frames of such serial networks allows communication of frames from an arbitrary arrangement of similar or differing networks within a consistently formatted connection between a client and server. Consequently, this generalized representation of the frames of such serial networks also allows for use and interpretation of such multiplex network frames by a client that has no previous knowledge of the types or formats of the multiplex network that it will receive; all relevant format and decoding information is contained within the client/server communication. Moreover, this generalization of differing types of multiplex network traffic facilitates communication between software and a multi-protocol device such as the device hardware.

The CP also incorporates mechanisms to allow control, status and event information communication between the client and server software entities. This inclusion allows for a uniform communication environment between software entities within the device system, regardless of whether these entities are servers, clients, plug-in applications or protocol handlers.

The CP is typically embedded within a TCP/IP connection between two software elements (the server, clients, etc.). Each CP frame consists of various elements discussed below.

A frame header that contains information about the required routing of the frame, where the identity of the source entity and the destination entity are specified. This header also contains an indication of the frame type, as well as the length of the entire frame. A frame-type specific header contains information specific to the frame type specified in the frame header. An optional payload for which the format or presence/absence of a payload depends on the frame type specified in the frame header.

Five frame types are herein defined, although more are easily envisioned. Some frames include the following frames:

Command frames contain commands that are sent by the source entity and received by the destination entity. These commands serve to control behavior or request information or actions of the destination target. The payload portion of the CP command frame is command-specific data. A number of generic system-wide commands are specified, but each software entity may have its own set of recognized and handled commands.

Response frames contain a destination entity's response to a previously-received command frame. This response frame is sent back to the entity that originally sourced the relevant command. The payload portion of the CP response frame is command-specific data.

Data frames contain encapsulated multiplex network frames. CP data frames contain an additional header that contains information about the encapsulated multiplex frame. This information includes a timestamp that applies to the transmit/receive time of the multiplex frame; indications of header/data/other field lengths within the encapsulated multiplex frame; indications of special modes or flags that may apply to the multiplex frame; the remainder of the payload of a CP frame contains the actual multiplex network frame; and CP data frames provide the primary mechanism by which multiplex network frames are gatewayed between the multiplex networks and the device system's application and remote clients.

Event frames contain information about system or software entity events. This data is not sent as a response to a request, but rather as independent event-driven notifications. The payload portion of a CP event frame contains event-specific data.

ASCII message frames contain zero-terminated human readable ASCII messages. There is no frame type specific header for this frame type because the entire remainder of the frame contains the payload, which is the ASCII message.

MISC frames user-defined data. No definitions are made for the format of the remainder of this frame type; it is open to user definition.

The software components of the device hardware/software system implement the device Communication Protocol and facilitate communication between multiplex networks, plug-in applications and protocols, and client applications. The general software architecture of the components of the device software system involved in the handling of the functionality is outlined in this description.

The software that resides on the device hardware platform consists of the following types of components.

The server program that implements the device Communication protocol. The server program handles communication between clients and other parts of the device software. The server acts primarily as a message router, routing GC Protocol frames between source entities and destination entities as specified by the routing information contained within each GC Protocol frame. The server communicates with device drivers by means of standard Unix character device interfaces.

Multiplex network hardware device drivers that are software modules to implement hardware access methods for each supported multiplex network hardware type. A separate loadable device driver module exists for each type of device daughtercard, where each daughtercard may implement one or more multiplex network interfaces. These modules provide a uniform software interface method to non-uniform types of hardware interfaces. Interface to specific hardware is accomplished by a memory of I/O space interfaces and system interrupts.

Plug-in application and protocols programs are loadable software modules that provide additional functionality to the device hardware/software system. One or more of these modules may be configured to load at start-up time and provide services such as message filtering, scheduling and autoresponding capabilities. Additional modules provide high-level protocol encoding and decoding (J1939, GM USDT and DeviceNet protocol modules are examples of supported plug-in protocol modules).

Hardware autodetection and configuration software programs detect the types of multiplex protocol daughtercards installed in the device hardware platform at runtime. These programs are responsible for loading of appropriate device driver modules for support of installed cards, as well as any configuration that is needed for each individual card. Detection of card identity is performed through the reading of serial EEPROMs located on each card by a dedicated serial interface. The EEPROMs contain card type and serial number as well as licensing and security information. All information gathered from installed cards in this manner is made available to the server program.

Plug-in software modules are described above include, but are not limited to, the following.

A message scheduler module provides a user-controllable multiplex network message scheduler. Lists of messages, sublists, iteration counts, and iteration periods are specified by client applications. The message scheduler tracks multiple schedules and notifies client programs via events when schedules complete. Message scheduling is performed by means of a real-time hardware clock and associated services provided by the operating system.

A message responder module provides user-definable message gatewaying functionality. It allows any arbitrary CP frame to be sent on receipt of any other arbitrary CP frame. Received frame matching is determined based on a user-defined filter definition that includes AND, OR, magnitude comparison, and bit mask/match operations.

A message filter module controls filtering of received multiplex network messages. The filter module allows individual client applications to choose the nature of the messages they receive based on a filter specification for each multiplex network channel that includes AND, OR, magnitude comparison, and bit mask/match operations.

A script loader module allows for the controlled download, management and activation of user-defined scripts. These scripts are typically generated by an external front-end editor/compiler software package.

The device hardware platform consists of a motherboard and zero or more multiplex protocol daughtercards. The device motherboard implements a modified PC architecture. The PC architecture includes the following elements and peripheral devices:
  Integrated CPU;
  Daughtercard interconnect slots;
  Alphanumeric LCD and keypad for user input/output;
  10-base-T Ethernet interface for client interconnection;
  EIA232 serial port for diagnostics and systems maintenance;
  Compact Flash socket for storage of system software and application;
  (2) PCMCIA slots for connection of industry standard peripherals;
  72-pin SODIMM socket for connection of system RAM;
  IDE interface for connection of mass-storage devices;
  A coin-cell battery for clock and configuration memory backup;
  IRDA infrared serial interface; and
  Piezoelectric speaker.

The motherboard can include the following components.

A CPU and associated buffering and memory. The board is based on the AMD Elan SC400 integrated CPU. Level shifting buffers provide translation between the 3.3VDC and 5 VDC portions of the system. A 72-pin small-outline dual inline memory module socket provides interface to a standard memory module, the module is used as the system's RAM.

A flash-ROM provides non-volatile memory space for the system's BIOS and boot routines.

Daughtercard interface slots provide a subset of ISA architecture signals, as well as proprietary signals that provide a card ID interface and predefined slot memory and I/O space decodes.

PCMCIA sockets for attachment of industry-standard PCMCIA devices.

Serial interfaces. One EIA232 interface and one IRDA interface are provided.

LCD and keypad. An alphanumeric LCD interface and a 4-key keypad are provided for user input/output capabilities.

Ethernet interface. A standard 10-base T Ethernet interface is implemented by means of a Crystal Semiconductor CS8900 device. This device provides the primary user communication interface.

Power supply interconnect. This interconnect forms an attachment point for a small DC-DC converter that provides system power supplies.

An ATA interface provides an attachment point for mass storage devices. One Compact Flash and one 44-pin IDE interface is provided.

A programmable logic block (CPLD) provides programmable logic space. This logic provides support for an LCD/keypad interface, daughtercard slot support, buffer control, and address decoding/interrupt routing for other system peripheral.

A power supply card provides three DC-DC converters that provide the device hardware platform's required supply voltages (3.3VDC, 5VDC and 12VDC). The supported input voltage range is between 6VDC and 35VDC, where the circuit provides protection against incorrect or reverse-polarity input voltages.

Daughtercards interface to the motherboard by card interface slots on the motherboard. Each slot implements a modified ISA interface. Up to three daughtercards may be installed at a time. The daughtercards include, but are not limited to, implementations of the following interfaces:
  CAN (ISO11898)
  CAN (ISO11992)
  Single-wire CAN
  GM J1850
  Ford J1850
  Chrysler J1850
  Chrysler CCD
  Ford UBP
  Honda UART-based protocol
  Keyword Protocol 2000

Optically isolated CAN
Optically isolated single-wire CAN
Optically isolated GM J1850
Optically isolated Keyword Protocol 2000

Each daughtercard includes a connector that mates with the motherboard daughtercard slot connector on one end and a multiplex network connector on the other. The daughtercards are physically mounted in such a way that the multiplex network connector protrudes through the back panel of the hardware unit. Each daughtercard also includes programmable logic that implements the ISA target interface and provides internal registers and other card resources. Each card includes a serial EEPROM that contains the type, serial number, and security and licensing information for that card.

The optically isolated cards provide fiberoptics that carry relevant network signals, where these optical signals are converted back to the desired multiplex network signals by small battery-operated satellite modules specific to the desired multiplex network.

The device protocol structure employs the standard Transmission Control Protocol/Internet Protocol (TCP/IP) services in such a manner to ensure the inter-operability of the device with existing PCs and standard network interfaces.

Another unique feature of the device allows the user to remotely reprogram or revise the device operating software via flash card. The operating software may be upgraded by replacing selected programs, or segments of the software, or replaced in its entirety.

The PC card (PCMCIA) slots provide for a backup by allowing the user to transfer data from the flash card to a "temporary" storage media, thus maintaining the original program integrity while making revisions to the device program.

Also, this same feature allows the user to update the device's resident data base, in the event that such a data base has been created for use as a reference or for some other purpose.

The device incorporates an on-board web server. This allows users to communicate with the device and perform functions via a web browser with HTML.

Other browser technologies that can be supported include XML and WML (for hand-held palm devices or WML enable cell phones).

Another key feature of the device is the ability to perform a remote flash memory update to the device.

Now turning to the drawings, circuits of the protocol adapter of the invention are shown in schematic in FIGS. 1 through 11.

Figure 10:
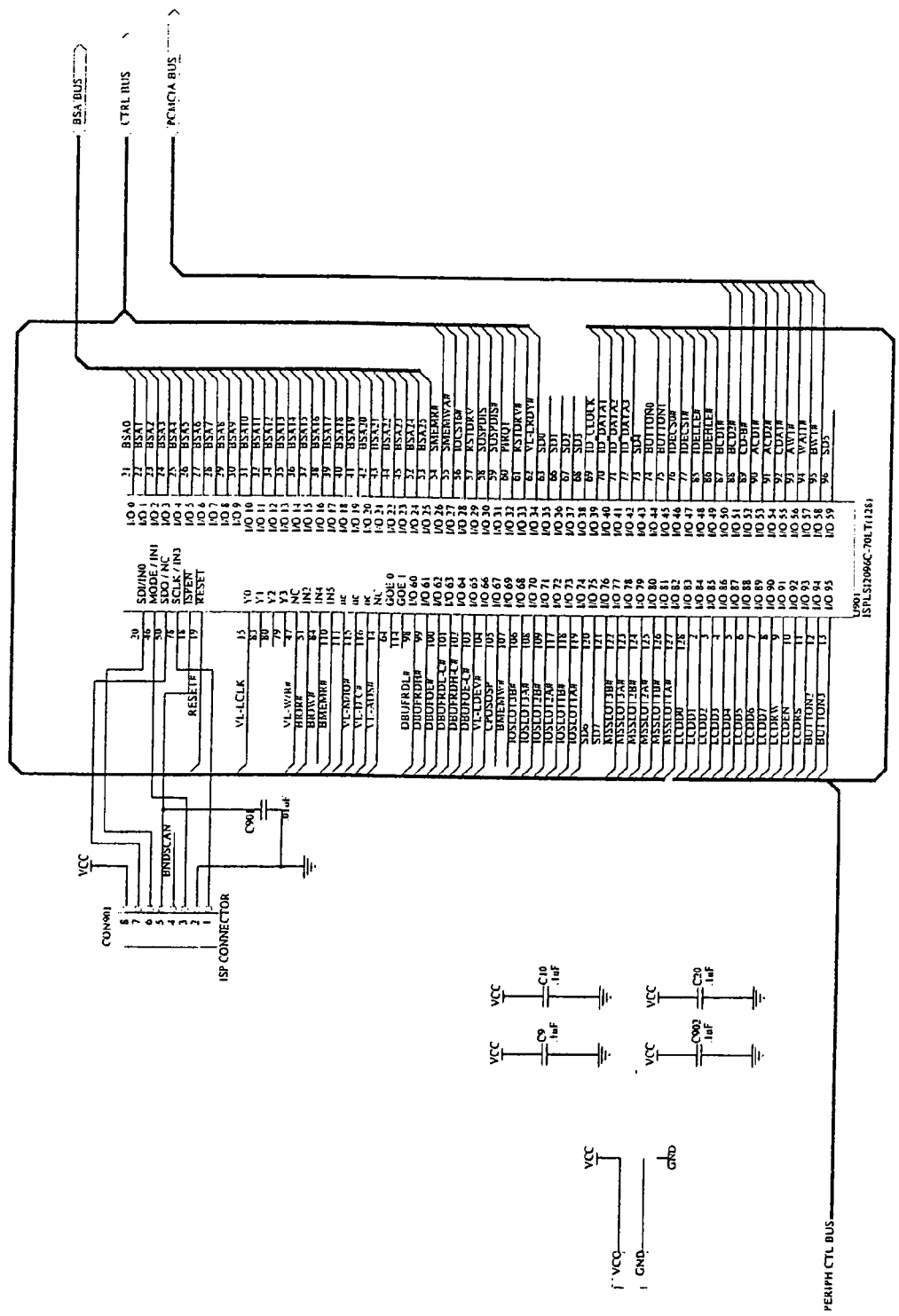
FIG. 10 illustrates device mainboard schematic: CPLD glue logic.

The operating software is depicted in a block diagram in FIG. 10 showing elements of the mainboard schematic. The general software architecture of the components of the device software system is provided by a server program 1 that handles communication between clients 6,6 through an O/S TCP/IP interface 8 on lines 14 and other parts of the device software 3,4,5 through and O/S local host interface 9. The server program 1 acts primarily as a message router, routing GC Protocol frames between source entities and a destination. The server program 1 communicates with the device drivers 2,2, etc. by standard Unix character device interfaces 7. The device drivers 2 also communicate with a memory/ space I/O space/interrupt hardware interface 13.

Hardware autodetection and configuration software 11 detect the types of multiplex protocol daughtercards installed in the device hardware platform at runtime. Thereafter the appropriate device driver modules 2,2, etc. are loaded for support of installed cards, as well as any configuration that is needed for each individual card. Detection of card identity is performed through the reading of serial EEPROMs located on each card by means of a dedicated serial interface 12. The EEPROMs contain card type and serial number as well as licensing and security information. All information gathered from installed cards in this manner is made available to the server program 1.

Plug-in software module Message scheduler 3 provides a user-controllable multiplex network message scheduler. Lists of messages, sublists, iteration counts, and iteration periods are specified by client applications. The message scheduler 3 tracks multiple schedules and notifies client programs via events when the schedules complete. Message scheduling is performed by means of a real-time hardware clock and associated services 10 provided by the operating system.

A message responder 5 provides user-definable message gatewaying functionality. The message responder 5 allows any arbitrary CP frame to be sent on receipt of any other arbitrary CP frame. Received frame matching is determined based on a user-defined filter definition that includeds AND, OR, magnitude comparison, and bit mask/match operations.

The message filter 4 controls filtering of received multiplex network messages. The filter 4 allows individual client applications to choose the nature of the messages they receive based on a filter specification for each multiplex network channel that includes AND, OR, magnitude comparison, and bit mask/match operations.

A script loader (not shown in FIG. 1) allows for the controlled download, management and activation of user-defined scripts. These scripts are typically generated an external front-end editor/compiler software package.

Figure 2:
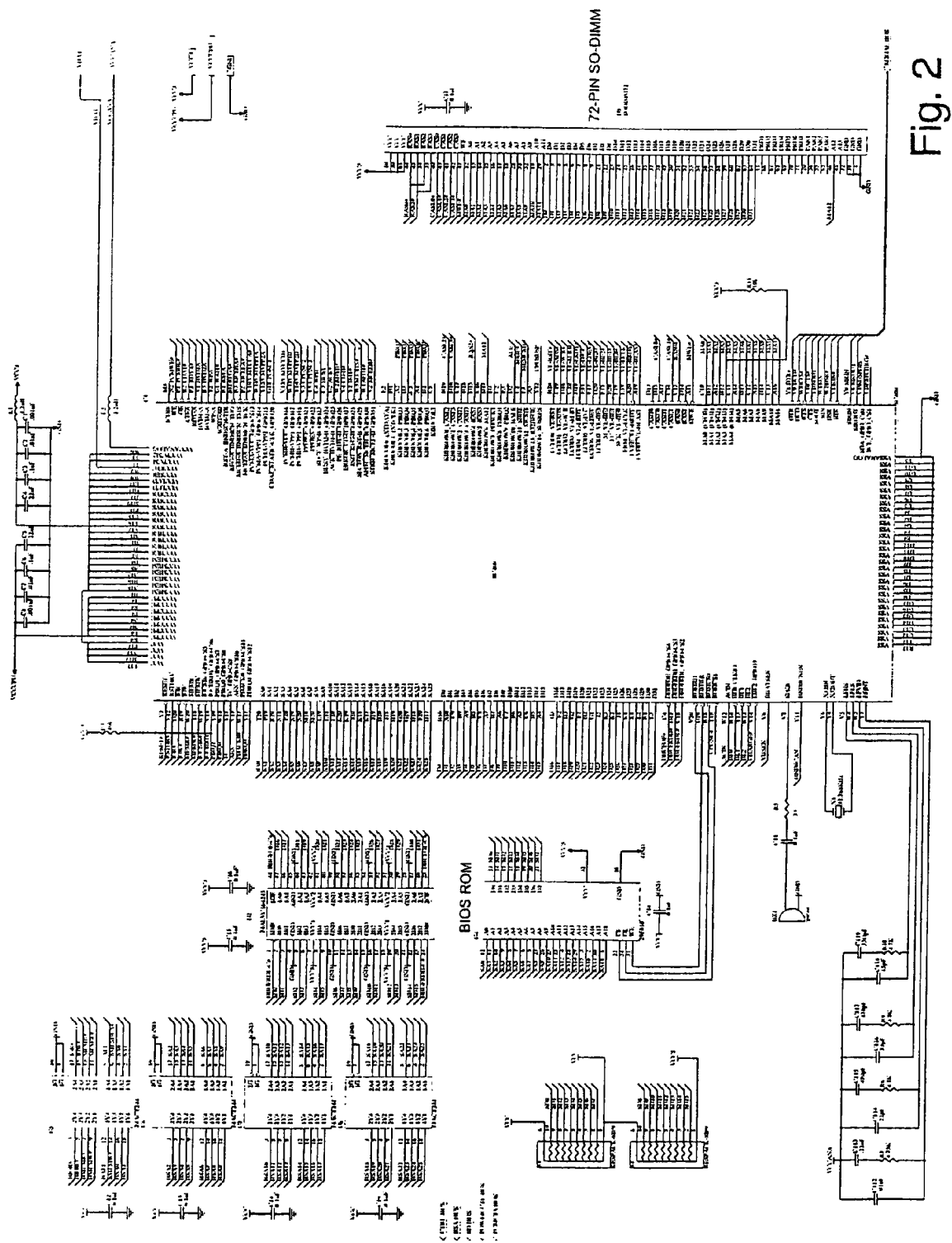
FIG. 2 illustrates device mainboard schematic: CPU, memory, buffers Central Processors, RAM, flash-ROM (for-BIOS)
Figure 3:
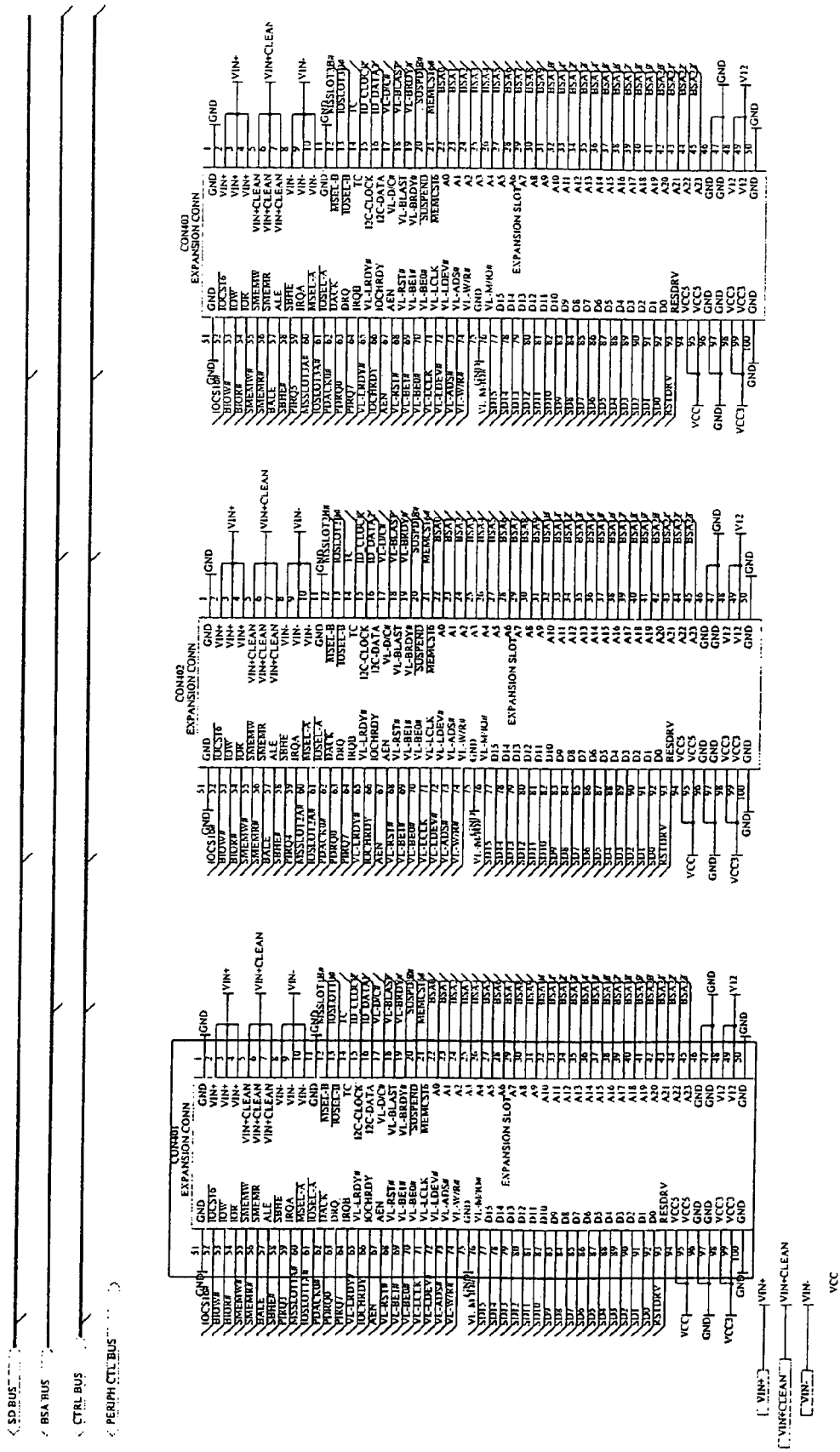
FIG. 3 illustrates device mainboard schematic: daughter-card interconnects modified ISA)

Now turning to FIG. 2, the device hardware platform is depicted as having a CPU and associated buffering and memory. The board is based on the AMD Elan SC400 integrated CPU. Level shifting buffers provide translation between the 3.3VDC and 5VDC portions of the system. A 72-pin small-outline dual inline memory module socket provides interface to a standard memory module. This module is used as the system's RAM. A flash-ROM provides non-volatile memory space for the system's BIOS and boot routines.

Daughtercard interface slots (FIG. 3) provide a subset of ISA architecture signals, as well as proprietary signals that provide a card ID interface and predefined slot memory and I/O space decodes.

Figure 4:
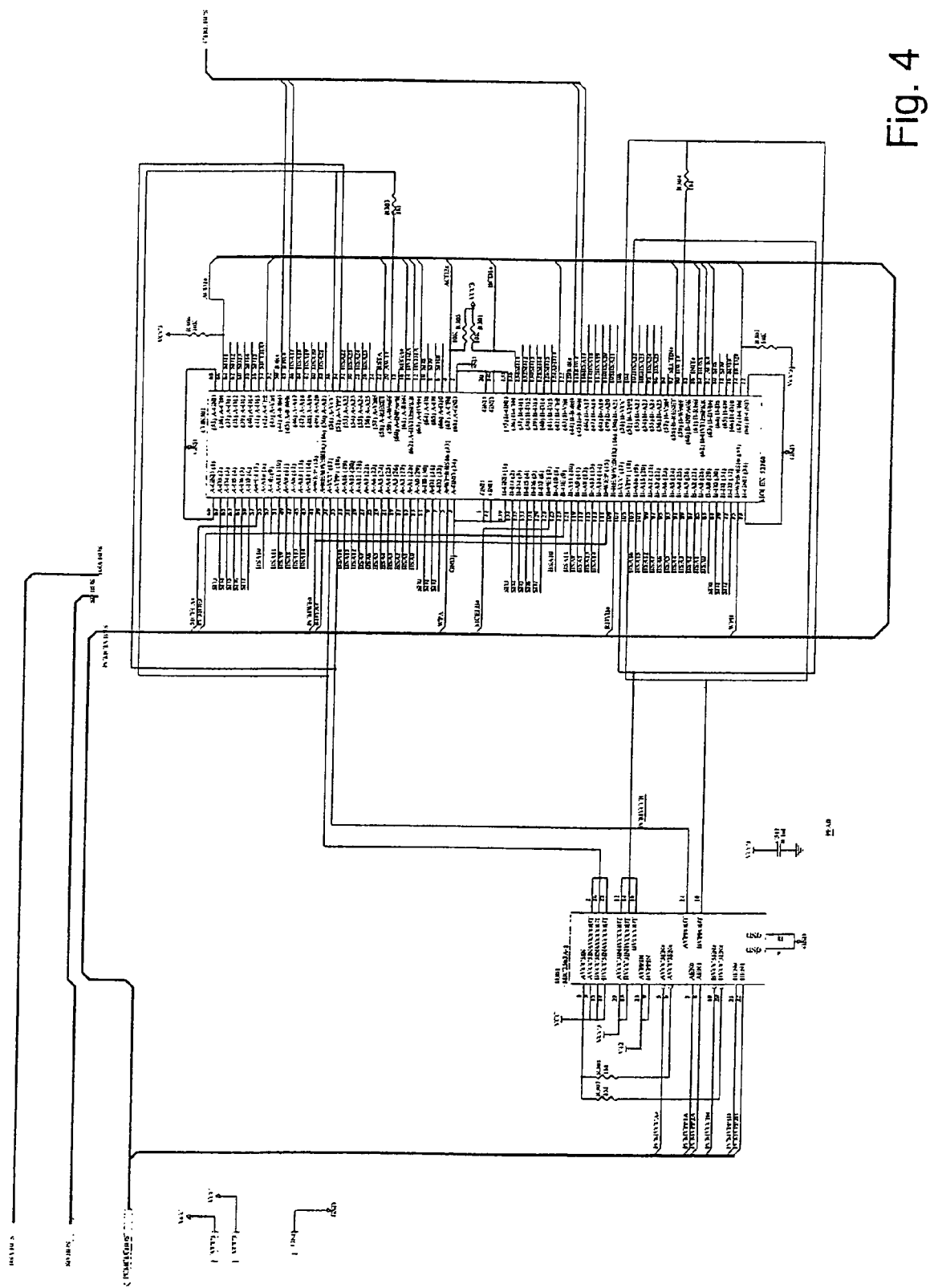
FIG. 4 illustrates device mainboard schematic.
Figure 5:
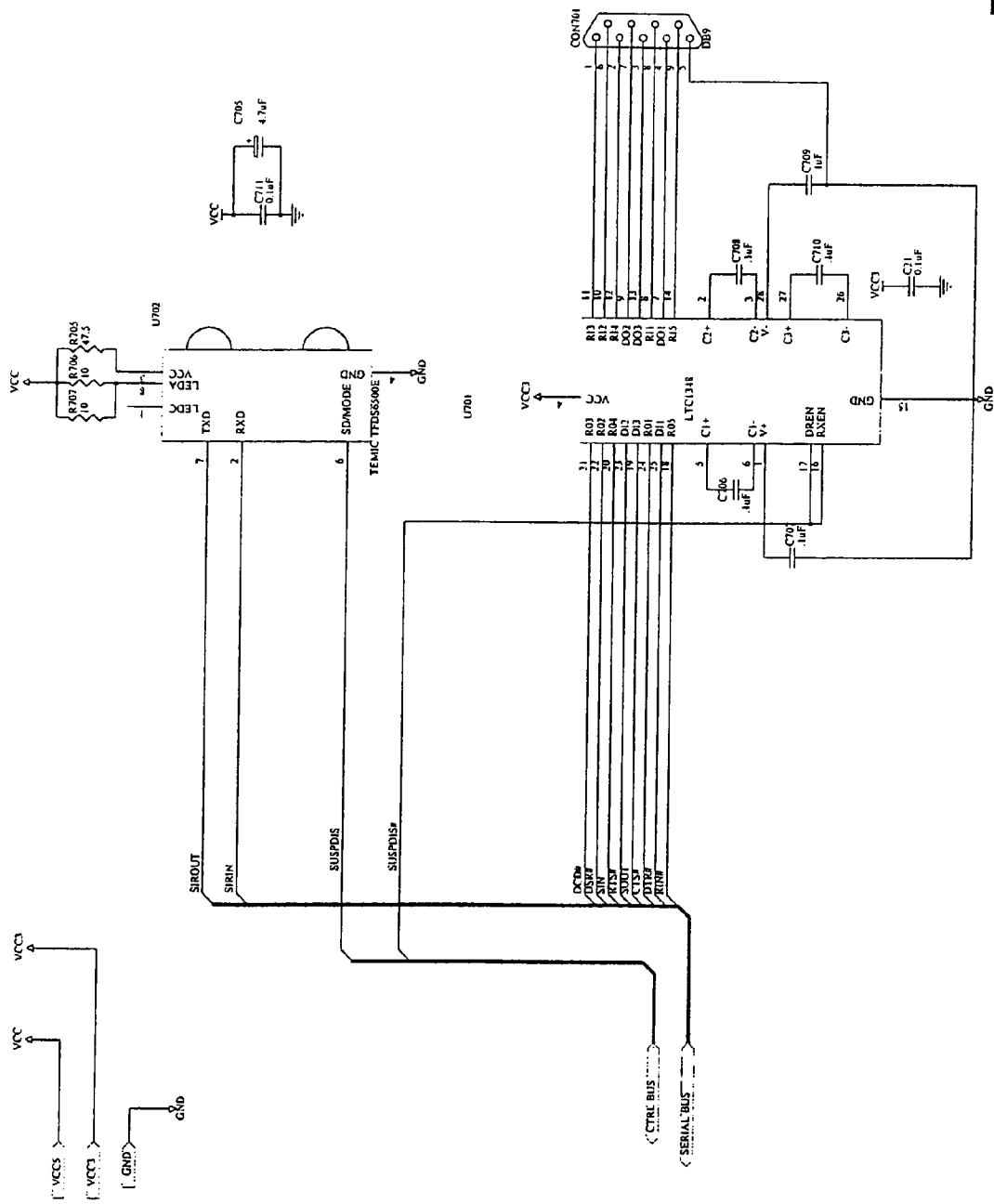
FIG. 5 illustrates device mainboard schematic: Serial devices (RS232 port, IRDA transceiver)
Figure 6:
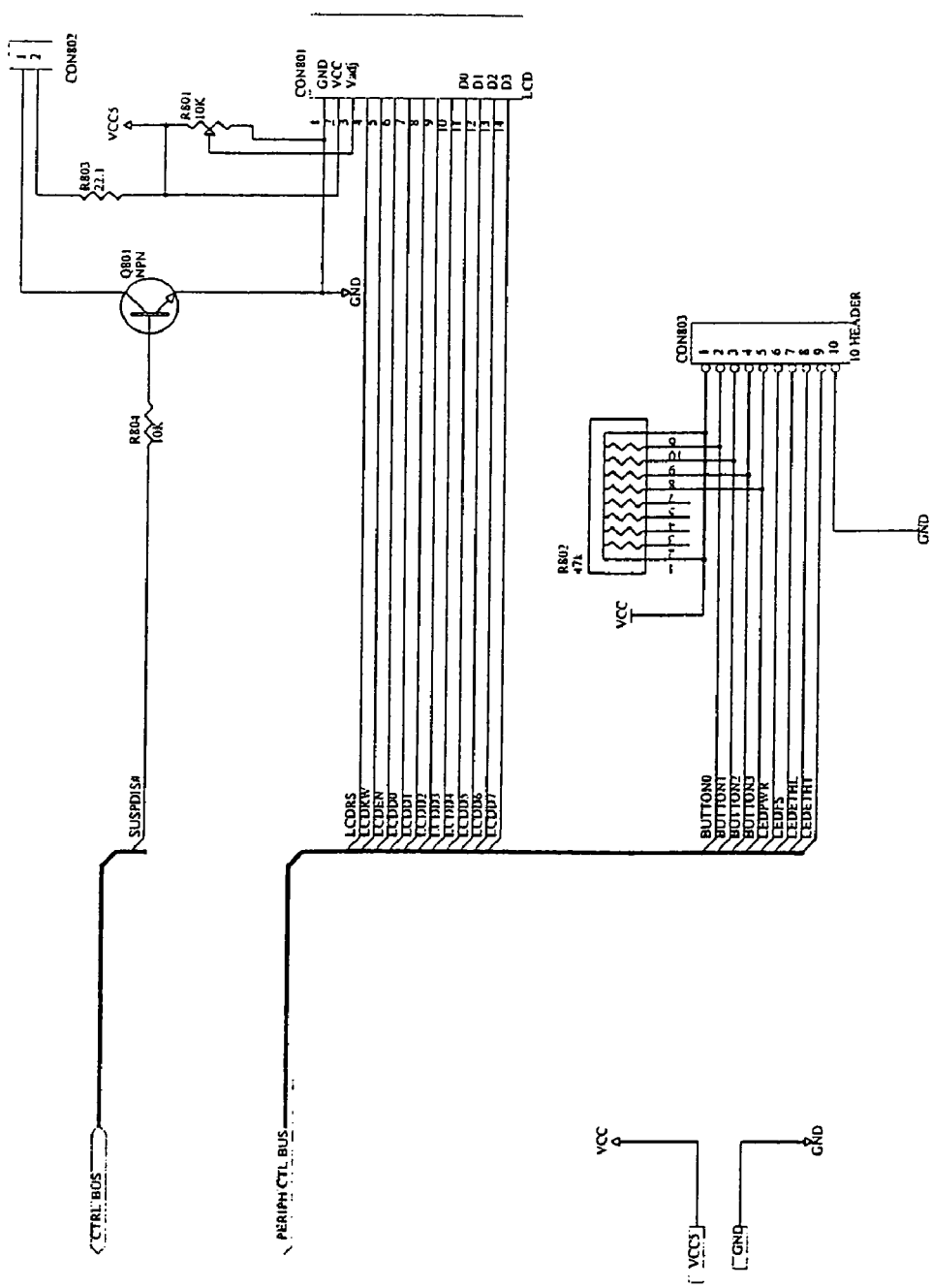
FIG. 6 illustrates device mainboard schematic: I/O devices (LCD, keypad connections)

Now turning to FIG. 4, PCMCIA sockets are provided for attachment of industry-standard PCMCIA devices. Serial interfaces are depicted in FIG. 5. LCD and keypad are shown in FIG. 6. An alphanumeric LCD interface and a 4-key keypad interface are provided for user input/output capabilities.

Figure 7:
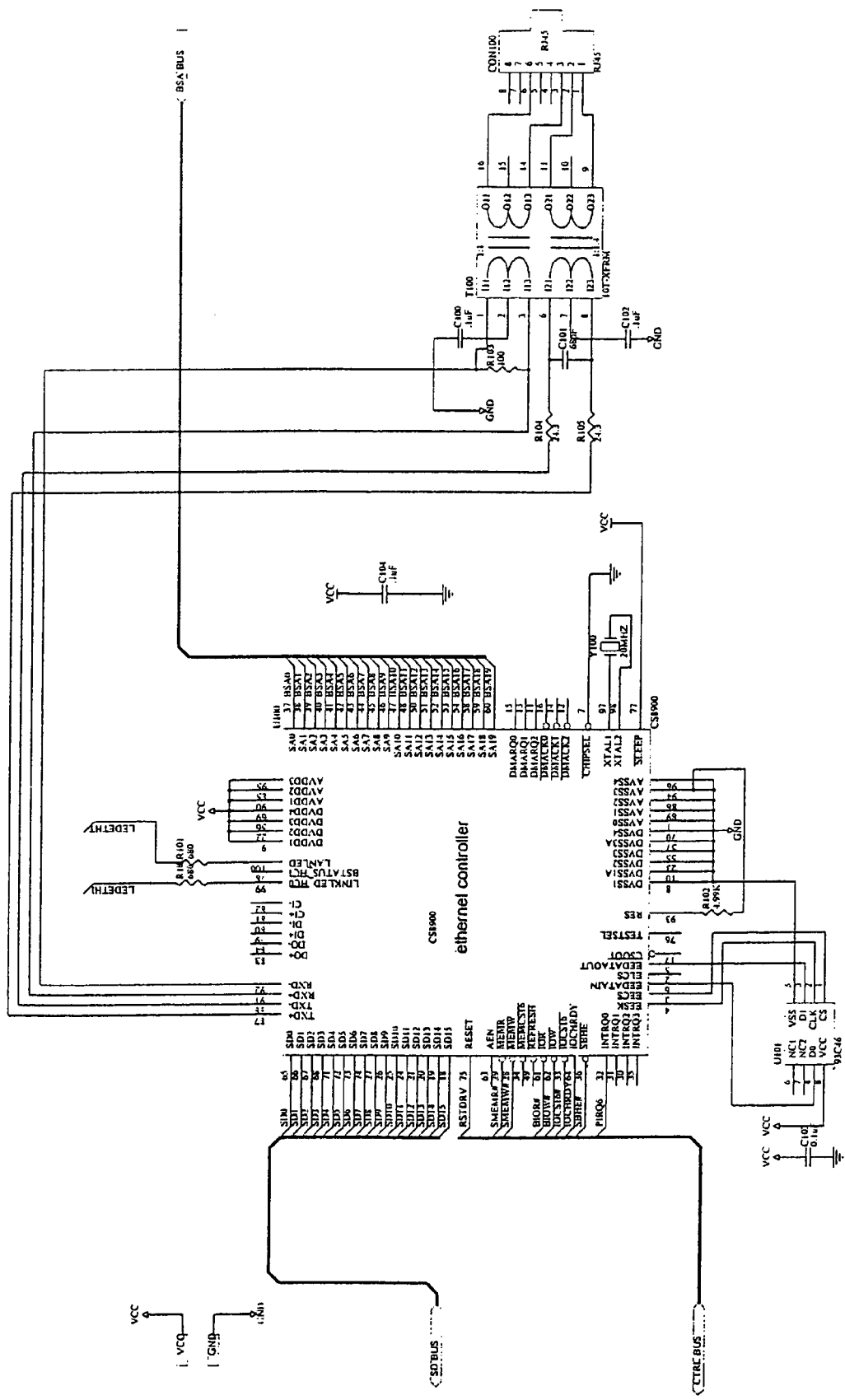
FIG. 7 illustrates device mainboard schematic: Ethernet controller.
Figure 8:
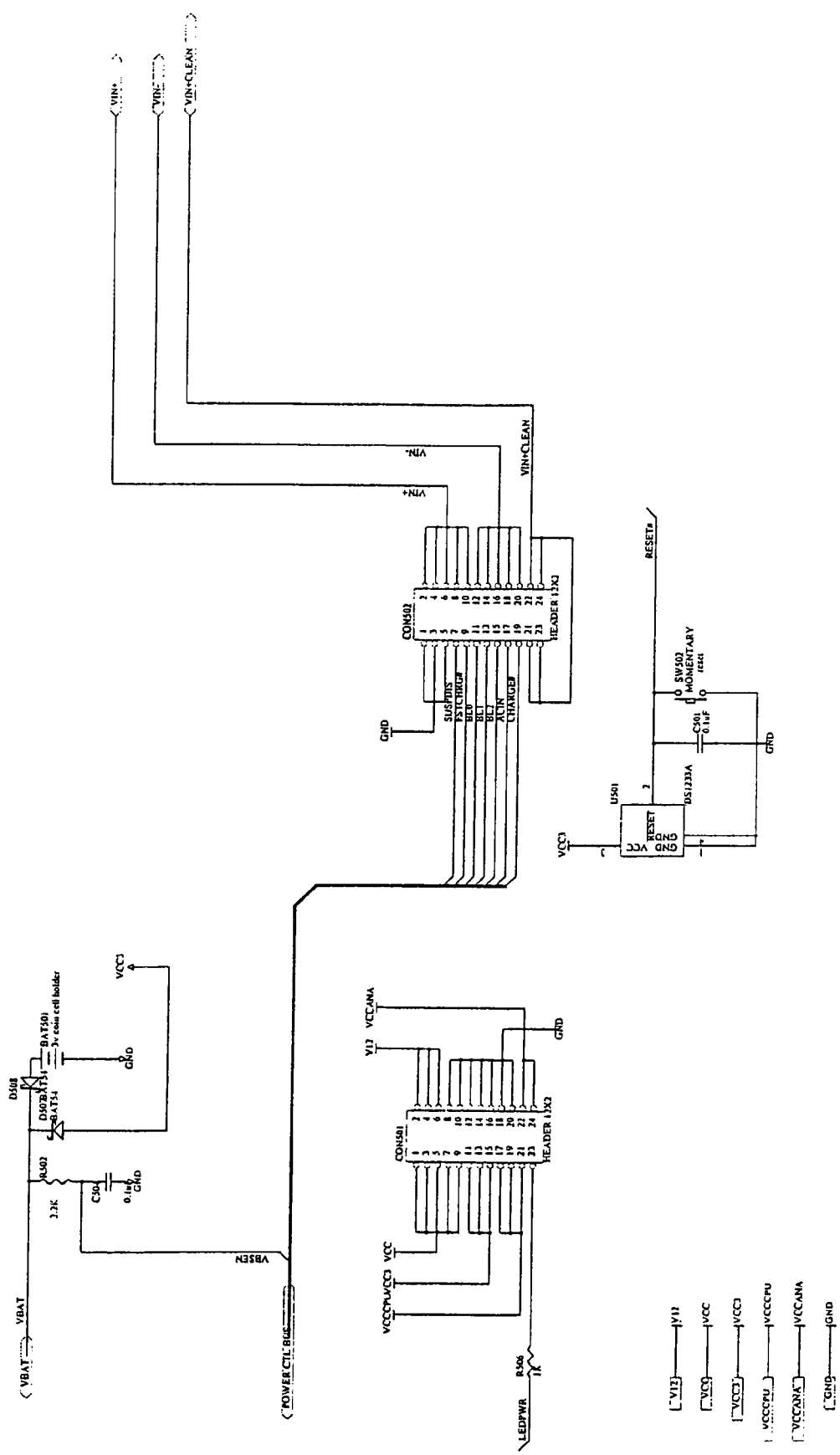
FIG. 8 illustrates device mainboard schematic: power supply interconnect.

An ethernet interface is shown in FIG. 7. A standard 10-base T Ethernet interface is implemented a Crystal Semiconductor CS8900 device. This device provides the primary user communication interface. FIG. 8 shows a power supply interconnect that forms an attachment point for a small DC-DC converter that provides system power supplies.

Figure 9:
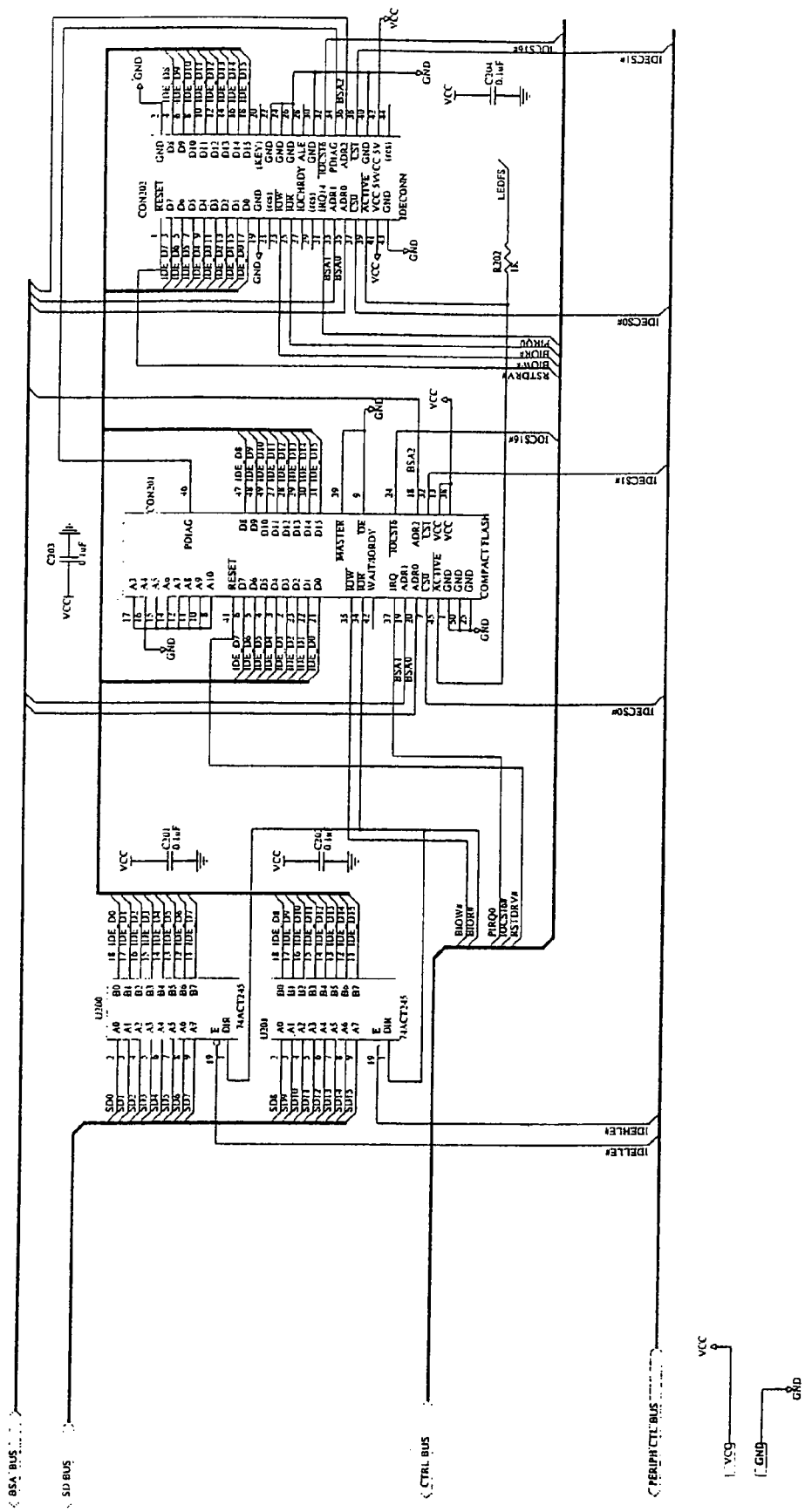
FIG. 9 illustrates device mainboard schematic: IDE device interface.

An ATA interface provides an attachment point for mass storage devices (FIG. 9). One Compact Flash and one 44-pin IDE interface is provided.

A programmable logic block (CPLD) provides a programmable logic space (FIG. 10). This logic provides support for a LCD/Keypad interface, a daughtercard slot support, buffer control, and an address decoding/interrupt routing for other system peripherals.

Figure 11:
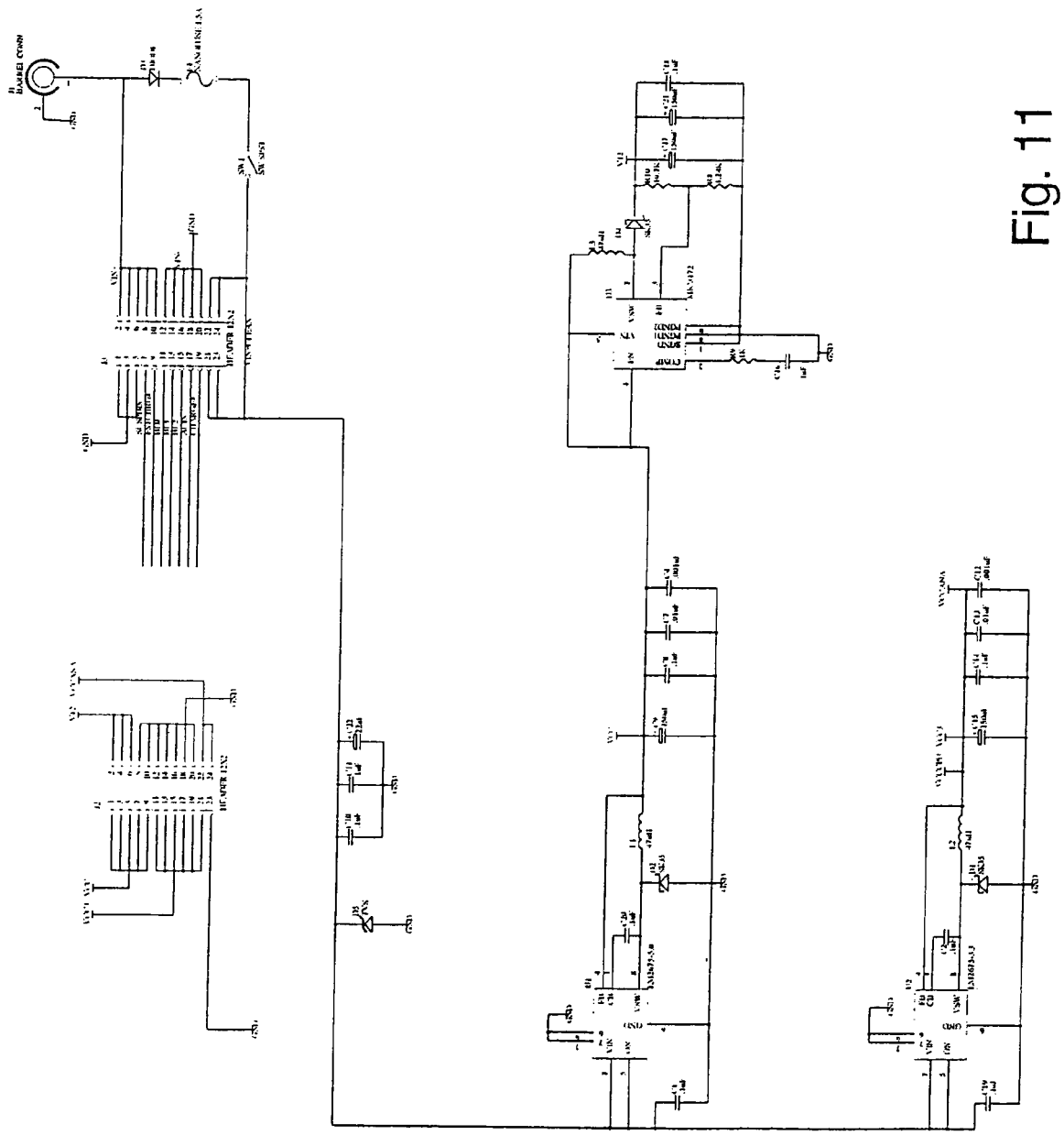
FIG. 11 illustrates device power supply board mainboard schematic.

FIG. 11 depicts a power supply card as providing three DC-DC converters that provide the device hardware platform's required supply voltages (3.3VDC, 5VDC and 12VDC). The supported input voltage range is between 6VDC and 35VDC. The circuit provides protection against incorrect or reverse-polarity input Voltages.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A protocol adapter for communicating with one or more remote computers of a vehicle network over any one of a plurality of protocols, said adapter comprising:
   a motherboard including an integrated central processing unit (CPU), a plurality of interface modules, a plurality of device drivers and a plurality of daughtercard interface slots, said CPU capable of simultaneously communicating with the one or more remote computers in the vehicle network operating different protocols;
   a server program operable for communicating with said one or more computers of the vehicle network through the use of an O/S TCP/IP interface;
   at least one daughtercard interface module having an associated protocol type and serial number, said at least one daughtercard interface module mounted in one of the plurality of daughtercard interface slots, wherein said at least one daughtercard interface module expands the number of protocols of the adapter beyond those protocols being run by the CPU;
   at least one of said plurality of device drivers in communication with said server program and associated with the protocol type of said daughtercard interface module mounted in said one of the plurality of daughtercard interface slots, wherein a separate device driver exists for each daughtercard interface module protocol type mounted in each one of the plurality of daughtercard interface slots; and
   hardware autodetection with configuration software programs operable for detecting the identity and type of said at least one daughtercard interface module mounted in one of said plurality of daughtercard interface slots, wherein said at least one device driver is loaded into said server program in response to the detection of the type of said at least one daughtercard interface module by said hardware autodetection software.

2. The protocol adapter according to claim 1 wherein the plurality of interface modules include a message scheduler module that includes a user-controllable multiplexed network message scheduler.

3. The protocol adapter according to claim 1 wherein the plurality of interface modules include a script loader module for allowing the controlled download, management and activation of user defined scripts.

4. The protocol adapter according to claim 1 wherein the plurality of interface modules includes a message filter module for filtering received multiplexed network messages.

5. The protocol adapter according to claim 1 wherein the plurality of interface modules include a message transponder module for providing user-definable message gatewaying functionality.

6. The protocol adapter according to claim 1 further comprising an on-board web server program for providing communication between the adapter and a web browser.

7. The protocol adapter claim 1 wherein the motherboard further includes a flash-ROM for providing non-volatile memory space.

8. The protocol adapter according to claim 1 wherein the motherboard further includes components selected from a group consisting of an alphanumeric LCD and keypad, a 10-T Ethernet interface, an EIA232 serial port, a compact flash storage, PCMCIA slots for connection of industry standard peripherals, a 72-pin SODIMM socket for connection of system RAM, and IDE interface for connection of mass-storage devices, a coin-cell battery for clock and configuration memory backup, an IRDA infrared serial interface, a piezo-electric speaker, level shifting buffers, an ATA interface for providing an attachment point for mass storage devices and a programmable logic block.

9. The protocol adapter according to claim 1 wherein the plurality of protocols are selected from the group consisting of controller area network protocols, J1850 protocols, key word protocol 2000, and UART-based protocols.

10. The protocol adapter according to claim 1 wherein the at least one daughtercard interface module is selected for the group consisting of SAJ185, UBP, CCD, SCI, Can, SAEJ1587,J1939, J2284,J2411,ISO 11992, 9141-2 and KWP2000 modules.

11. A protocol adapter for communicating with one or more remote computers of a vehicle network over any one of a plurality of protocols, said adapter comprising:
   a motherboard including an integrated central processing unit (CPU) wherein the CPU is capable of simultaneously communicating with the one or more remote computers of the vehicle network over the plurality of protocols, where the plurality of protocols are selected from the group consisting of controller area network protocols, J1850 protocols, keyword protocol 2000 and UART-based protocols;
   a server program operable for communicating with said one or more computers of the vehicle network through the use of an O/S TCP/IP interface;
   at least one daughtercard interface module having an associated protocol type and serial number, said at least one daughtercard interface module mounted in one of the plurality of daughtercard interface slots, wherein said at least one daughtercard interface module expands the number of protocols of the adapter beyond those protocols being run by the CPU;
   at least one device driver in communication with said server program and associated with the protocol type of said daughtercard interface module mounted in said one of the plurality of daughtercard interface slots, wherein a separate device driver exists for each daughtercard interface module protocol type mounted in each one of the plurality of daughtercard interface slots; and
   hardware autodetection with configuration software programs operable for detecting an identity and type of said at least one daughtercard interface module mounted in one of said plurality of daughtercard interface slots on said motherboard, wherein said at least one device driver is loaded into said server program in response to the detection of the type of said at least one daughtercard interface module by said hardware autodetection software.

12. The protocol adapter according to claim 11 further comparing a message scheduler module that includes a user-controllable multiplexed network message scheduler.

13. The protocol adapter according to claim 11 further comprising a script loader module for allowing the controlled download, management and activation of user defined scripts.

14. The protocol adapter according to claim 11 further comprising a message filter module for filtering received multiplexed network messages.

15. The protocol adapter according to claim 11 further comprising a message transponder module for providing user-definable message gatewaying functionality.

16. The protocol adapter according to claim 11 wherein the motherboard further includes components selected from a group consisting of an alphanumeric LCD and keypad, a 10-base T Ethernet interface, an EIA232 serial port, a compact flash storage, PCMCIA slots for connection of industry standard peripherals, a 72-pin SODIMM socket for connection of system, RAM, an IDE interface for connection of mass-storage devices, a coin-cell battery for clock and configuration memory backup, an IRDA infrared serial interface, a piezoelectric speaker, level shifting buffers, an ATA interface for providing a attachment point for mass storage devices and a programmable logic block.

17. The protocol adapter according to claim 11 wherein the at least one daughtercard interface module is selected from the group consisting of SAJ1850, UBP, CCD, SCI, CAN, SAEJ1587, J1939, J2284, J2411, ISO 11992, 9141-2 and KWP2000 modules.

18. A protocol adapter for communicating with one or more remote computers of a vehicle network over any one of a plurality of protocols, said adapter comprising:

a central processing unit (CPU) being capable of simultaneously communicating with the one or more remote computers of vehicle network operating different protocols;

a message scheduler module that includes a user-controllable multiplexed network message scheduler;

a script loader module for allowing the controlled download, management and activation of user-defined scripts;

a message filter module for filtering received multiplexed network messages;

a message transponder module for providing user-definable message gatewaying functionality;

an on-board web server program for providing communication between the adapter and a web browser, said on-board web sewer operable for communicating with said one or more remote computers of a vehicle network through the use of an O/S TCP/IP interface;

at least one daughtercard interface module having an associated protocol type and serial number, said at least one daughtercard interface module mounted in one of a plurality of daughtercard interface slots, wherein said at least one daughtercard interface module expands the number of protocols of the adapter beyond those protocols being run by the CPU;

at least one device driver in communication with said on-board web server program and associated with the protocol type of said daughtercard interface module mounted in said one of the plurality of daughtercard interface slots, wherein a separate device driver exists for each daughtercard interface module protocol type mounted in each one of the plurality of daughtercard interface slots; and hardware autodetection with configuration software programs operable for detecting an identity and type of said at least one daughtercard interface module mounted in one of said plurality of daughtercard interface slots on said motherboard, wherein said at least one device driver is loaded into said on-board web server program in response to the detection of the type of said at least one daughtercard interface module by said hardware autodetection software.

19. The protocol adapter according to claim 18 further comprising components selected from a group consisting of an alphanumeric LCD and keypad, a 10-base T Ethernet interface, an EIA232 serial port, a compact flash storage, PCMCIA slots for connection of industry standard peripherals, a 72-pin SODIMM socket for connection of system RAM, an IDE interface for connection of mass-storage devices, a coin-cell battery for clock and configuration memory backup, an IRDA infrared for providing an attachment point for mass storage devices and a programmable logic book.

20. The protocol adapter according to claim 18 wherein the at least one daughtercard interface module is selected fro the group consisting of SAJ1850, UBP, CCD, SCI, CAN, SAEJ1587, J1939, J2284, J2211, ISO 11992, 9141-2 and KWP2000 modules.

* * * * *

UNITED STATES PATENT AND TRADEMARK OFFICE
CERTIFICATE OF CORRECTION

PATENT NO.        : 7,603,471 B2                                              Page 1 of 1
APPLICATION NO.   : 10/970199
DATED             : October 13, 2009
INVENTOR(S)       : Sodergren It is certified that error appears in the above-identified patent and that said Letters Patent is hereby corrected as shown below:

Column 8,
Line 19, "includeds" should be -- includes --.

Column 10,
Line 19, Claim 10, "SAJ185" should be -- SAJ1850 --.

Column 10,
Line 19, Claim 10, "Can" should be -- CAN --.

Column 12,
Line 33, Claim 19, "an IRDA infrared for providing an attachment point for mass storage devices and a programmable logic book." should be -- an IRDA infrared serial interface, a piezoelectric speaker, level shifting buffers, an ATA interface for providing an attachment point for mass storage devices and a programmable logic block --.

Column 12,
Line 37, Claim 20, "fro" should be -- from --.

Column 12,
Line 39, Claim 20, "J2211" should be -- J2411 --.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,603,471 B2  Page 1 of 1
APPLICATION NO. : 10/970199
DATED : October 13, 2009
INVENTOR(S) : Jason Sodergren It is certified that error appears in the above-identified patent and that said Letters Patent is hereby corrected as shown below:

Column 10,
Line 19, Claim 10, "SAJ1850" should be -- SAE J1850 --.

Signed and Sealed this

Twenty-third Day of November, 2010

David J. Kappos
*Director of the United States Patent and Trademark Office*